Oct. 6, 1964  J. A. FORD  3,151,666
PANEL TRAVERSING AND SUPPORTING MEANS
Filed Dec. 18, 1961  5 Sheets-Sheet 1

INVENTOR.
JAMES A. FORD
BY
Woodhams Blanchard & Flynn
ATTORNEYS Oct. 6, 1964     J. A. FORD     3,151,666
PANEL TRAVERSING AND SUPPORTING MEANS
Filed Dec. 18, 1961     5 Sheets-Sheet 2

INVENTOR.
JAMES A. FORD
ATTORNEYS

Oct. 6, 1964  J. A. FORD  3,151,666
PANEL TRAVERSING AND SUPPORTING MEANS
Filed Dec. 18, 1961  5 Sheets-Sheet 3

INVENTOR.
JAMES A. FORD
BY
Woodhams, Blanchard & Flynn
ATTORNEYS

United States Patent Office 3,151,666
Patented Oct. 6, 1964

3,151,666
PANEL TRAVERSING AND SUPPORTING MEANS
James A. Ford, Lafayette, Calif., assignor to Kirsch Company, Sturgis, Mich., a corporation of Michigan
Filed Dec. 18, 1961, Ser. No. 159,851
19 Claims. (Cl. 160—346)

This invention relates to traverse means for supporting a flexible, downwardly extending panel and particularly to such means adapted for enabling said panel to move sidewardly from one position to another.

Inasmuch as the present invention arose out of efforts expended in the drapery hardware field, the invention will be described and illustrated in terms of a traversing device particularly adapted to the support and sideward movement of draperies. However, it will be recognized that while the invention has many advantages which are particularly valuable in the drapery hardware field, in its broader aspects it is also well adapted for use in other fields and accordingly the use of drapery traversing hardware to illustrate the invention will be recognized as for illustrative purposes only and as not limiting.

In the approximately 35 years since the original introduction of the presently standard traverse rod, traverse rod constructions of this general type have been made in extremely large numbers and installed in a wide variety of homes, offices and institutions and other generally similar places of use. During this time, a multitude of minor variations have been made in the construction introduced commercially in the middle 1920's but basically the traverse rod now being sold in large numbers is different only in minor details from the original construction. Various major modifications, and some entirely different traverse rod designs, have been suggested from time to time since the presently common traverse rod was originally introduced, but insofar as I am aware, those which received any commercial acceptance at all, and those are relatively few, were destined to enjoy only a short commercial life and none of them particularly jeopardized the dominant position of the presently standard traverse rod as above mentioned.

However, during all of this time that said presently standard traverse rod has been made, sold and used, there have been numerous disadvantages experienced with it which disadvantages have been recognized but which have been tolerated as unavoidable without exceeding feasible cost limits.

Prominent among these disadvantages has been the placement of the panel supporting slides in a position on the rear side of the traverse rod, said rear positioning being made necessary by appearance considerations, namely, that the placement of the hanger supporting slot on the front side of the rod would present an unattractive and totally unacceptable appearance. This placement of the hangers on the rear side of the rod has thus necessitated the forward tilting of the upper edge of the drapery to enable it to extend upwardly above the forward side of the rod as has been frequently desired for appearance purposes. This forward tilting of the upper edge of the drapery has in itself provided an undesirable appearance and, in an attempt to minimize such forward tilting, hangers have sometimes been used which extend forwardly from their point of support at the rearward side of the rod. This forward extension of the hangers has tended to twist said hangers in their supporting slot causing them to bind therein and has often required substantial force to overcome. This at best has rendered the traversing of the draperies somewhat difficult and has often been subject in many cases to a rather stringent limitation upon the width of the drapery which could be operated as a single unit.

To meet this problem, some attempts have been made to place the hanger supporting slot on the underside of the traverse rod but this has in the past been undesirable inasmuch as the traverse cords then lie directly above the hangers, often droop down between the hangers and frequently tangle therewith and jam the operation of the traverse assembly. Hence the placement of the hangers on the underside of the traverse rod has in the past been considered unacceptable and as a source of more troubles than it cures.

A further problem with conventional traverse rod constructions has arisen where it has been desired to extend the window to a point very close to the ceiling of a room. Presently common traverse rod constructions have required a minimum clearance between the upper edge of the window and the ceiling (unless the traverse rod is to be exposed through the window which is undesirable) a distance at least equal to the distance from the upper edge of the traverse rod to the lower edge of the hanger supporting slot, plus the vertical extent of the hangers below said lower edge. While this distance is not normally very great, it nevertheless cannot be ignored and has provided a definite limit to the minimizing of wall space between the upper edge of the window and the ceiling of a room. Accordingly, a construction has long been desirable which would still further diminish this minimum required space but which would do so without detracting from the appearance of the finished assembly.

A further problem has been that known as "pack-back," which means the space occupied by the drapery when in its full open position. Since the cord-carrying pulleys in conventional constructions are normally at the ends of the traverse rod, the distance to which the draperies can slide when in their full open position is limited by the presence of the pulleys and/or the pulley housings. The construction of the present invention permits the drapery to be pushed past the pulley structures so that the limit to which the draperies can be opened is increased by the width of the pulley structures. This last consideration is particularly important where it is desired to have windows of maximum width with respect to the walls of the room.

A further problem arises, with an extremely wide window, if it is desired to eliminate the "pack-back" space limitation altogether by causing the drapery to turn a corner at opposite ends and lie against the wall adjacent the opposite ends of the window. With conventional traverse rod structure, since it is necessary that the pulleys governing the operation of the cords are placed at the extreme outer ends of the traverse rods, such a construction with conventional traverse rod designs required that the cords turn the corner also and this provided various complications well known to the trade. Accordingly, it is desirable to provide a design by which the drapery can be caused to turn such a corner without the necessity of the cords similarly turning the corner.

With these and other problems inherent to previously known traverse rod designs in mind, the objects of the invention are:

(1) To provide a traverse rod construction for supporting a sidewardly movable, depending, flexible panel under conditions requiring minimum effort to effect a traversing movement.

(2) To provide a traverse rod construction, as aforesaid, providing separate channels for the travel of the flexible panel and for housing the operating cords, master slides and pulleys whereby the flexible panel is enabled to move on past the pulleys at the end of the cord channels.

(3) To provide a traverse rod assembly, as aforesaid, minimizing the pack-back distance required at the ends of said traverse rods.

(4) To provide a traverse rod construction, as aforesaid, minimizing the spacing required from the ceiling of a room to the lower edge of the hanger-supporting means.

(5) To provide apparatus, as aforesaid, in which the drapery-supporting rails can be extended on past the ends of the cord-supporting and guiding channels whereby the draperies may be caused to turn a corner at a point beyond the cord-supporting pulleys without requiring said cords to follow such turn.

(6) To provide a traverse rod assembly which may be mounted either on the ceiling at the point of use or from a wall as desired.

(7) To provide a traverse rod assembly, as aforesaid, which, whether mounted on the ceiling or on the side wall will permit the upper edge of the drapery to extend into close proximity with the ceiling.

(8) To provide a traverse rod construction, as aforesaid, wherein the traverse rod can be made either by extrusion methods or by rolling methods according to the specific usage required and/or material used.

(9) To provide traverse rod construction, as aforesaid, wherein one portion of the traverse rod construction can be an extruded fabrication and the other portion can be of roll formed fabrication, whereby the completely assembled unit may enjoy the strength of an extruded shape while obtaining for at least a portion thereof the inexpensiveness of a roll formed structure.

(10) To provide traverse rod construction, as aforesaid, wherein the hanger-carrying track and the cord-guiding means are capable of being made in two separate units whereby to obtain greater flexibility of materials, design, inventory, and fabrication than is now possible with presently conventional apparatus.

(11) To provide a specific design within the scope of the objectives above listed having an extremely attractive appearance whereby the portion thereof which is exposed when the draperies are retracted will not be unsightly or otherwise harmful to the overall appearance of the window area.

(12) To provide traverse rod construction, as aforesaid, which is highly flexible, applicable in a variety of specific designs and arrangements and for meeting a variety of different specific uses all without serious, if any, modification of the component parts.

(13) To provide traverse rod construction, as aforesaid, which will provide a product of high quality without material advance in cost over previously known traverse rod constructions.

(14) To provide a traverse rod construction which will be extremely simple and fool-proof in operation and thereby operable for a long period of time with a minimum of maintenance.

(15) To provide a traverse rod design, as aforesaid, which while primarily applicable to use with residential, office or institutional draperies is nevertheless readily adaptable to a wide variety of other generally similar uses, particularly for supporting a wide variety of other types of flexible or semiflexible or articulated panels.

Other objects and purposes of the invention will be apparent to persons acquainted with an apparatus of this general type upon a reading of the following description and inspection of the accompanying drawings.

GENERAL DESCRIPTION

In general the invention contemplates the use of dual channels, one channel providing track means along its lower edge for the panel-supporting carriers and the other channel providing support for the cord-carrying end pulleys together with a housing guiding and enclosing the panel-traversing cords. Preferably, the channels are provided by a single extruded member having a pair of openings therethrough, but said channels can in certain instances be provided by separate constructions which are subsequently fastened together to provide a single unit at the time and place of use.

Whichever channel construction is used, the hanger-supporting channel has a slot at its lower edge and downwardly converging surfaces on either side of said slot for holding suitable carriers in self-centering relationship to said slot. The adjacent cord-guiding and enclosing channel preferably opens at the side, but it may open at the bottom, if desired, especially where the track structure is to be substantially recessed into a ceiling.

Figure 1:
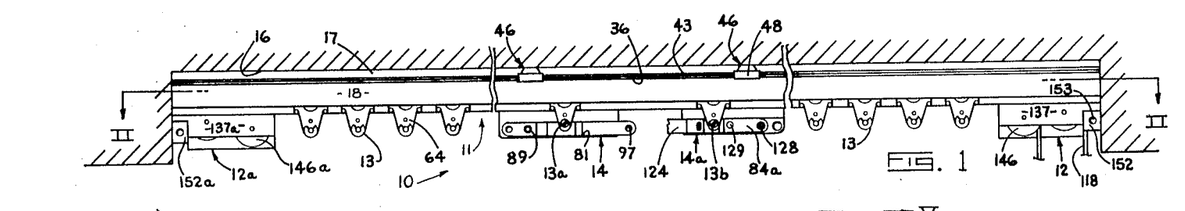
FIGURE 1 is a broken, front elevational view of a traverse assembly embodying the invention.
Figure 11:
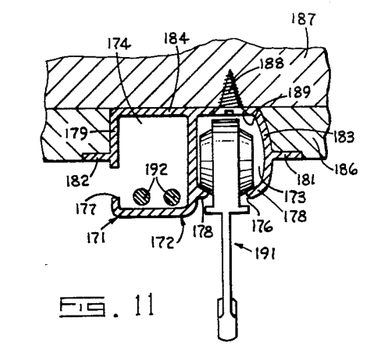
FIGURE 11 is a cross-sectional view of a dual channel track member disclosing an alternate embodiment of the invention.
Figure 12:
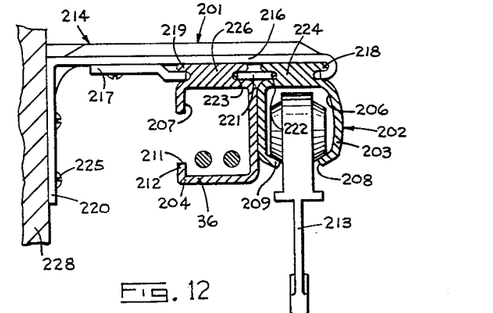
FIGURE 12 is an end view of another traverse assembly disclosing a further, dual channel track member.
Figure 13:
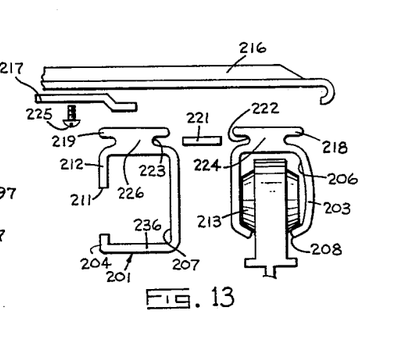
FIGURE 13 is an exploded view of the traverse assembly shown in FIGURE 12.

For convenience in description, the terms "upper," "lower" and words of similar import will have reference to the traverse assembly of the invention in its normal position of operation, as appearing in FIGURES 1, 11 and 13. The terms "front" and "rear" will have reference, respectively, to the right and left sides of the traverse assembly as appearing, for example, in FIGURES 2 and 12. The terms "inner," "outer" and derivatives thereof will have reference to the geometric center of said traverse assembly and parts thereof.

DETAILED CONSTRUCTION

The traverse assembly and parts thereof which have been selected to illustrate a preferred embodiment of the invention are shown primarily in FIGURES 1 to 11, inclusive. Said assembly includes an elongated, dual channel track member 11 (FIGURE 3) having pulley assemblies 12 and 12a (FIGURE 1) mounted at the opposite ends thereof, a plurality of panel-supporting carriers 13 and one or more master carriers 14 and 14a which are supported upon the track member 11 for movement lengthwise thereof. The track member 11 is preferably, but not necessarily, extruded or roll formed from a durable material, such as aluminum, to produce an elongated substantially rigid support for the carriers 13, 14 and 14a.

Specifically, the track member 11 (FIGURE 1) is normally mounted so that its top wall 17 is in a substantially horizontal position and, if desired, adjacent a ceiling 16. Said track member has a front wall 18, a center wall 19 (FIGURES 2 and 4) and a rear wall 20 which are integral with, and extend downwardly from, the top wall 17. The rear wall 20 (FIGURE 4) has spaced upper and lower portions 24 and 25 defining a lengthwise slot 23 therebetween. Said portions 24 and 25 are used as guide rails, as discussed hereinafter. The slot 23 communicates throughout its length with the passageway 34 defined between the center wall 19 and rear wall 20.

Track member 11 (FIGURE 4) also includes a substantially horizontal bottom wall 27 having a lengthwise slot 28 therein between the front wall 18 and center wall 19. The slot 28 is defined by the edge portions 29 and 30 which project toward each other from said walls 18 and 19, respectively, and thereby serve as support rails, as discussed hereinafter. The slot 28 communicates throughout its length with the passageway 33 which is defined between the walls 18 and 19.

Figure 3:
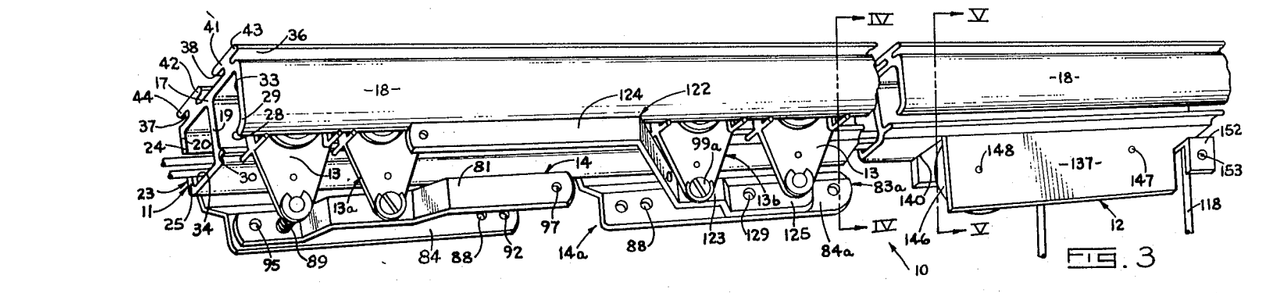
FIGURE 3 is a perspective view of a portion of said traverse assembly.
Figure 4:
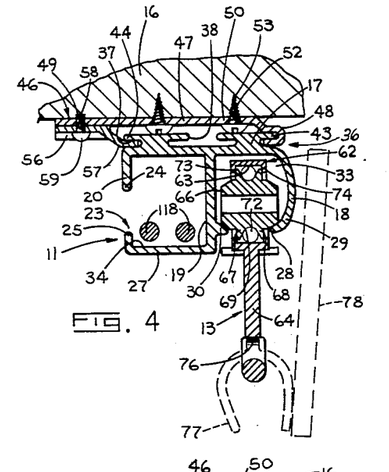
FIGURE 4 is a sectional view taken along the line IV—IV in FIGURE 3 and showing a panel supporting carrier installed therein.

The top wall 17 (FIGURES 3 and 4), which is substantialy thicker than the other walls of the track member 11, is provided with means for engaging a mounting bracket which means in the illustrated embodiment comprises a frontwardly opening groove 36, a rearwardly opening groove 37 and an upwardly opening, undercut groove 38, all of which preferably extend the full length of the track member 11. The upper groove 38 is undercut both frontwardly and rearwardly to provide flanges 41 and 42 which preferably lie substantially within the plane defined by the front and rear flanges 43 and 44, which are created by and above the grooves 36 and 37, respectively. These flanges provide for the engagement and support of the track member 11 by the clamp bracket 46 (FIGURE 4).

Said bracket 46 is comprised of an elongated bar 47 having a downwardly projecting hook 48 at the front end thereof and an upwardly offset central portion 50 (FIGURE 6) extending lengthwise thereof. Said bar 47 has a threaded opening 49 (FIGURE 4) near its rear end and a pair of smooth openings 52 through the offset portion 50, through which screws 53 can be slidably received for threaded engagement with the ceiling structure 16, to which said clamp bracket 46 may be secured. The hook 48 is received into the front groove 36 so that it grips the front flange 43 when the bar 47 is adjacent the top wall 17.

The clamp plate 56 has a downwardly offset edge 57 which is receivable into the rear groove 37 for holding the rear flange 44 against the bar 47. The clamp plate 56 has an opening 58 through which a screw 59 is received for threaded reception into the threaded opening 49 in the bar 47, whereby the clamp plate 56 is held against the bar 47. The opening 58 may be elongated toward and away from the offset edge 57 to provide for adjustment of the plate 56 lengthwise of the bar 47.

The carriers 13, 13a, 13b (FIGURES 1, 2, 3 and others) are comprised, as more fully shown in application, Serial No. 102,800, now Patent Number 3,076,222, assigned to the same assignee as this application, of a body member 62 having a centrally disposed cylindrical opening 63 (FIGURE 4) therethrough and an integral hanger element 64 extending away from said body member radially with respect to the central opening 63. A roller 66 is rotatably disposed within the central opening 63 and extends axially beyond both sides of the body member 62 for simultaneous engagement with, and support upon, the edge portions 29 and 30 of the bottom wall 27. Said roller 66 has a pair of spaced, annular and external flanges 67 and 68 defining an annular groove 69 containing a plurality of bearing balls 72 engageable with the walls defining the central opening 63 for rotatably supporting the roller 66 within the body member 62. Said body member 62 has at the opposite ends of the opening 63 a pair of radially inwardly-extending flanges 73 and 74 which overlap the remote sides of the flanges 67 and 68 for holding the roller 66 within the body member 62. The hanger element 64 has a pin opening 76 at its lower end for reception of a pin 77 by means of which an article, such as the drape 78, can be suspended upon and from the carrier 13. The body member 62 is slidably disposed between the edge portions 29 and 30 for movement lengthwise thereof.

The master carrier 14 (FIGURES 7 to 10, inclusive) includes a carrier 13a, similar to carrier 13 above described, to which a hanger bar 81 and outrigger or bridge member 82 are secured. The outrigger 82 is comprised of an elongated plate 83 having lower and upper edge portions 84 and 85 which are bent in opposite directions out of the plane of the central portion 87, so that they preferably lie in spaced, substantially parallel planes. The lower edge portion 84 (FIGURES 7 and 9) has a pair of screw openings 88 (FIGURES 9A and 9B) therethrough near the opposite ends thereof and through which a screw 89 can be received for threaded engagement with the threaded opening 94 (FIGURES 9A and 10) in the offset end portion 93 of the hanger bar 81. Said edge portion 84 also has a pair of dimple openings 92 on the remote sides of the screw openings 88. The offset portion 93 of the hanger bar 81 has a sidewardly projecting dimple 95 which is spaced from the threaded opening 94 the same distance as the distance between a screw opening 88 and dimple opening 92 at one end of the edge portion 84. The screw 89, which extends through the screw opening 88 in the edge portion 84, is threadedly received into the threaded opening 94 when the dimple 95 (FIGURES 8, 9 and 9A) extends into the dimple opening 92 whereby the hanger bar 81 is positively secured to the plate 83. The hanger bar 81 has a pin opening 97 (FIGURES 3, 9A and 10) near the free end thereof, through which a pin 77 may be inserted for supporting a panel, and also has a threaded opening 98 (FIGURE 9A) between its ends. A screw 99 is inserted, preferably slidably, through the pin opening 76a in the carrier 13a and threadedly inserted into the opening 98 in the hanger bar 81 for securing the hanger bar 81 to the carrier 13a.

The upper edge portion 85 of the plate 83 (FIGURE 10) has a pair of preferably identical sliders 102 secured thereto near the opposite ends thereof. Each slider (FIGURE 7) has a lengthwise groove 103 in the lower side thereof into which the edge portion 25, defining the lower side of the slot 23, is slidably disposable for guiding the movement of said slider, hence the outrigger 82 and the master carrier 14 in their movement lengthwise of the track member 11. Where the track member 11 is made of aluminum, for example, the carrier 13a and the sliders 102 are preferably fabricated from a waxy material, such as nylon, having self-lubricating characteristics.

The upper edge portion 85 (FIGURE 9) of the plate 83 has an upwardly opening notch 104 (FIGURES 8 and 9), which is created by cutting a flap 106 therein and bending said flap rearwardly into a position substantially perpendicular to said upper edge portion. A slot 107 is cut in the plate 83 directly below the notch 104 at the junction of the upper edge portion 85 and central portion 87. A channel-shaped, clamping element 108 has a vertical web 109 which slidably extends through the slot 107 so that it is parallel with, and adjacent to, the inner surface of the upper edge portion 85. The upper flange 112 of the clamp element 108 projects rearwardly through the notch 104 so that it is disposed substantially parallel with and directly above the flap 106. The lower flange 113 (FIGURE 9) of the clamp element 108 extends rearwardly beneath, and parallel with, the flap 106, and has a threaded opening 114 therethrough. A screw 116 is threadedly received through the opening 114 for engagement at its upper end with the lower side of the flap 106. The edge 117 of the upper flange 112 (FIGURE 8) is bent downwardly toward the flap 106. Thus, an elongated, flexible element, such as a drapery cord 118 (FIGURES 8 and 9), which is disposed between the flange 112 and the flap 106 can be gripped between the flange 112 and the flap 106 when the screw 116 is tightened.

Figure 8:
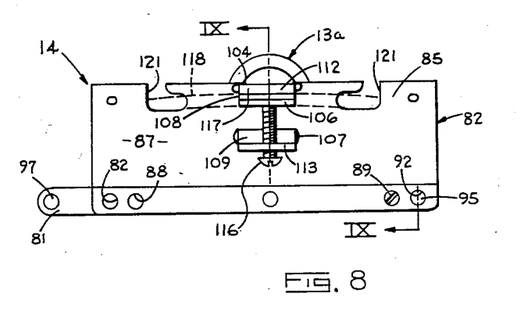
FIGURE 8 is a rear side elevational view of the master carrier shown in FIGURE 7.
Figure 9:
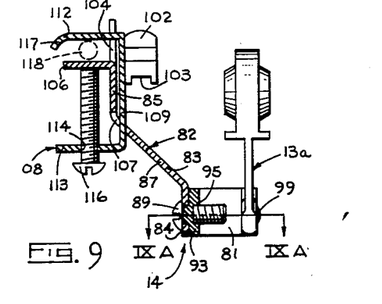
FIGURE 9 is a sectional view taken along the line IX—IX in FIGURE 8.
Figure 9A:
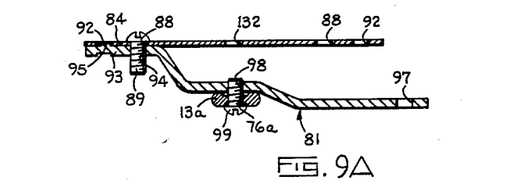
FIGURE 9A is a sectional view of one hanger bar taken along the line IXA—IXA in FIGURE 9.
Figure 9B:
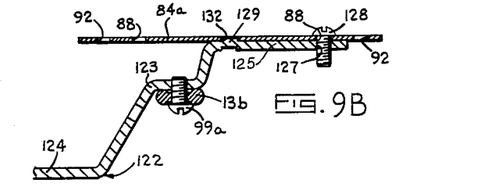
FIGURE 9B is a similar sectional view showing the overlapping mating hanger bar.
Figure 10:
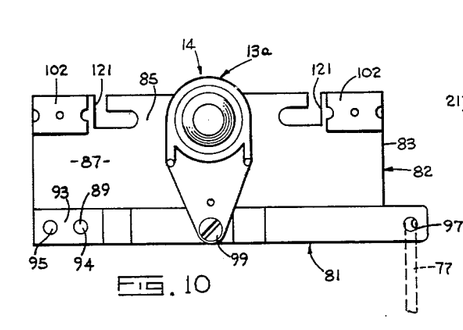
FIGURE 10 is a front side elevational view of the master carrier shown in FIGURE 8.

A pair of horizontally elongated slots 121 (FIGURE 8) are provided through the upper edge portion 85 so that they open through the upper edge thereof adjacent and between the sliders 102. As shown in FIGURE 8, the cord 118 passes through the slots 121 on opposite sides of the clamp element 108.

Figure 7:
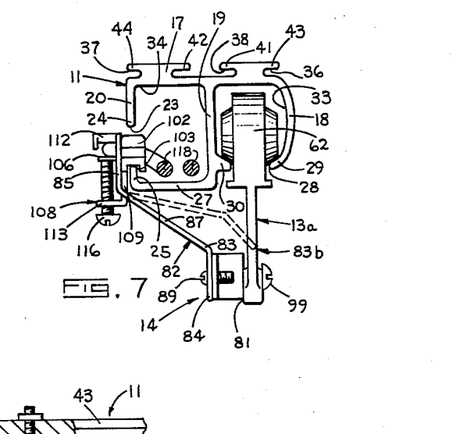
FIGURE 7 is an end view of a dual channel track member supporting a master carrier.

The outrigger 82, including its sliders 102, can be removed from its engagement with the edge portion 25 of the rear wall 20 either by removing the screw 89, which connects the hanger bar 81 to the plate 83 or by removing the screw 99 which connects the hanger bar 81 to the carrier 13a and then moving the plate 83 from its solid line position to its broken line position 83b in FIGURE 7. By such rotation, the sliders 102 are pivoted around the edge portion 25 so that they can be moved upwardly and outwardly away from within the slot 23. The upper surfaces of the sliders 102, as shown in FIGURE 7, are rounded to facilitate this action and, at the same time, to prevent accidental disengagement of the sliders 102 from within the slot 23 when the outrigger 82 is in its normal, solid line position of operation. Thus, it will be seen that any carrier 13 can be converted into a supporting part 13a or 13b for a master carrier 14 or 14a, respectively, simply by connecting a hanger bar 81 or 122 and an outrigger 82 or 82a thereto. This arrangement permits the placement or replacement of master carriers at any desired point in a traverse assembly 10 without removing a pulley assembly 12 or 12a from the end thereof.

Figure 2:
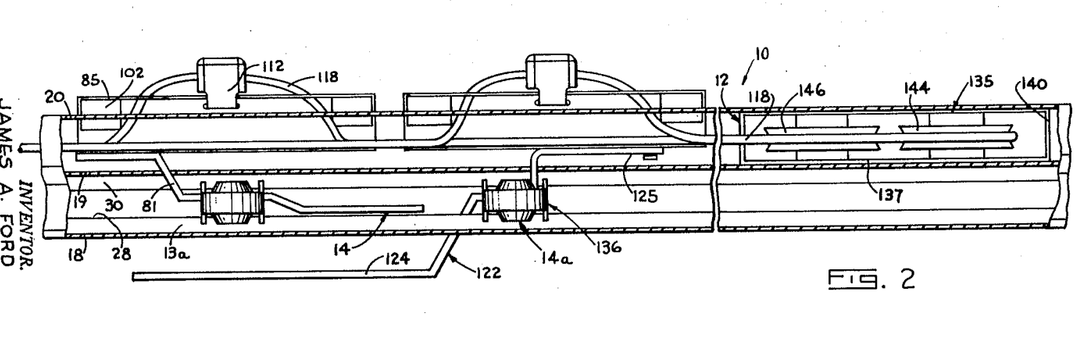
FIGURE 2 is a sectional view taken on the line II—II of FIGURE 1.

The master carrier 14a (FIGURES 1 and 2) may be substantially identical with the master carrier 14, just described, except that a hanger bar 122, different from hanger bar 81, is required on carrier 14a to permit an overlapping positioning thereof with the hanger bar 81 during the normal operation of the master carriers 14 and 14a in their closed positions. The hanger bar 122 (FIGURES 2, 3 and 9B) has a central portion 123 and two end portions 124 and 125 which lie in spaced, parallel planes and, therefore, are offset from each other. The end portion 125 has a threaded opening 127 into which a screw 128 is threadedly received for securing the hanger bar 122 to the lower edge portion 84a of the plate 83a (FIGURE 3). Said end portion 125 also has a dimple 129 receivable into the opening 132 (FIGURE 9B) in the lower edge portion 84a, midway between the ends thereof, for holding said hanger bar 122 against movement with respect to said edge portion 84a around the screw 128. The central offset portion 123 of the bar 122 is secured to the lower end of another carrier 13b (similar to carrier 13) by means of a screw 99a.

The pulley assembly 12 (FIGURES 5 and 6), in this embodiment thereof, includes a channel-shaped, pulley casing 135 having a top wall 136 and a pair of downwardly extending side walls 137 and 138, which are preferably parallel. A portion of the bottom wall 27 of the track member 11 is removed from adjacent one end of the passageway 34 to provide an opening 140 (FIGURE 2) through which said pulley casing 135 can be slidably received into the passageway 34 with the top wall 136 of said casing 135 adjacent the top wall 17 of the track member 11. The casing 135 is held in position by screws 139 which are slidably received through alined openings 141 and 142 (FIGURE 6) in the top walls 17 and 136, respectively, for engagement by nuts 143.

Figure 5:
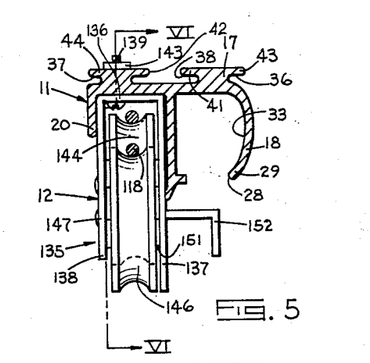
FIGURE 5 is a sectional view taken along the line V—V in FIGURE 3.

A pair of pulleys 144 and 146 (FIGURE 6) are rotatably supported by the axles 147 and 148 upon and between the side walls 137 and 138 (FIGURE 5). The pulleys 144 and 146, which may be fabricated from a waxy material, such as nylon, have integral hubs 149 and 151, respectively, for spacing them slightly from the side walls 137 and 138. An L-shaped finger 152 (FIGURES 5 and 6) may be struck out of the front side wall 137 and provided with a pin opening 153 which is aligned with and directly below the slot 28 communicating with the front passageway 33. The finger 152 may, therefore, be used to support one end of a panel, the remainder of which may be supported by the carriers 13 and 14 or 14a. The pulley assembly 12a may be a mirror image of the pulley assembly 12. Thus, the same numerals used to identify parts of the assembly 12 may be used with the suffix "a" to identify corresponding parts in the pulley assembly 12a (FIGURE 1).

OPERATION

The traverse assembly (FIGURE 1) is preferably used where it is desirable to support a panel, such as a drape, from a ceiling 16 or other horizontal structure. However, the traverse assembly can also, by using support brackets of the type shown in FIGURE 12, be mounted upon a substantially vertical side wall or the like. Where the traverse assembly is mounted upon the ceiling 16, the bar 47 of bracket 46 is secured to said ceiling (FIGURE 4) by the screws 53 so that the hook 48 is disposed approximately where it is desired to locate the front wall 18 of the track member 11. Under normal circumstances, several of the clamp brackets 46 will be required so that several bars 47 will normally be secured to the ceiling with their hooks 48 properly aligned.

The track member 11 is preferably precut in the proper length for the desired installation, but such cutting can be accomplished at the site of the installation, if desired. A portion of the bottom wall 27 is removed from adjacent both ends of the passageway 34 (FIGURE 6) to provide the opening 140 for later insertion of the pulley assemblies 12 and 12a (FIGURE 1).

Figure 6:
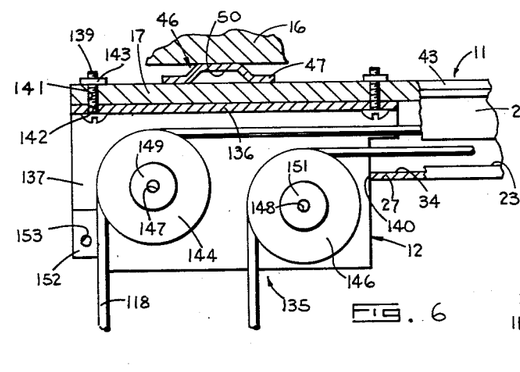
FIGURE 6 is a sectional view taken along the line VI—VI in FIGURE 5.

The casings 135 and 135a of a pair of pulley assemblies 12 and 12a, respectively, may be inserted into the passageway 34 through the openings 140 in wall 27 at the opposite ends of track 11. The pulley assembly 12, which is shown in FIGURES 1, 2 and 5, will be at the rightward end of the track member 11 as appearing from the front side of the traverse assembly 10. The pulley assembly 12a (FIGURE 1) is located at the other end of the track member 11. The pulley assembly 12, for example, is placed in the passageway 34 so that the finger 152 thereon is located near the end of the passageway 33 and blocks the removal of the carriers 13 and 14 therefrom. The pulley casings 135 are secured in position by means of screws 139 and nuts 143, as shown in FIGURE 6. By placing the pulley assemblies 12 and 12a at opposite ends of the track member 11, the traverse assembly can be used for either one-way or two-way traversing. Also, the control of the cord 118 can be shifted from one end to the other end of the track member 11, simply by changing the manner in which said cord is threaded through the two pulley assemblies, without making any modification in the structure of the traverse assembly and without removing said assembly from the wall.

The track member 11, including the carriers 13, 14 and 14a, the pulley assemblies 12 and 12a, and the cord 118 can now be mounted in position by inserting the flange 43 into the hooks 48 on the several clamp brackets 46 after which the offset edges 57 of the several clamp plates 56 are inserted into the rear groove 37 and are thereafter rigidly secured to their respective bars 47 by screws 59. Alternatively, the track 11 may be mounted first and the hangers and pulley assemblies installed, or replaced, later.

A portion of the cord 118 (FIGURE 7) is now urged outwardly through the slot 23 and downwardly into the slots 121 (FIGURE 8) in the upper edge portion 85 of the plate 83 on opposite sides of the clamp element 103, so that said portion is disposed between the flap 106 and the flange 112. The screw 116 is then tightened so that relative movement between the cord 118 and the master carrier 14 is prevented. Another portion of the cord 118 may be connected to the master carrier 14a (FIGURE 2) in substantially the same manner.

Appropriate panels, such as the drape 78 (FIGURE 4), can now be mounted upon the carriers 13 and 14 and the L-shaped finger 152 by the pins 77 for movement lengthwise of the track member 11 in response to movement of the cord 118 around the pulleys in the pulley assemblies 12 and 12a. It will be seen that the cord 118, being in the passageway 34, is completely independent of and cannot interfere with the freedom of movement of the carriers 13 lengthwise of the track member 11. Moreover, the carriers 13 can move to the very end of the passageway 33 without any interference from or with the pulley assemblies 12 and 12a, which are disposed within the passageway 34. These two innovations increase the pack back space for the carriers 13 within the track member 11, by comparison with existing track constructions, thereby increasing the percentage of open space which can be provided between a given pair of panels supported upon a given length of track.

ALTERNATE STRUCTURES

FIGURE 11

The traverse assembly 171 (FIGURE 11) includes an elongated rigid track member 172 having wall means defining front and rear passageways 173 and 174, respectively, which extend lengthwise of the track member 172. Elongated slots 176 and 177 are provided through the bottom wall 178 and rear wall 179, respectively, of the track member 172 so that they communicate with the passageways 173 and 174, respectively.

A pair of coplanar flanges 181 and 182 are integral with, and extend sidewardly from, the front wall 183 and rear wall 179, respectively, so that they are substantially parallel with and spaced downwardly from the top wall 184 of the track member 172. The flange 182 is preferably adjacent to the upper edge of the slot 177 and spaced from the top wall 184 a distance preferably no greater than the normal thickness of the plaster 186 on the supporting structure, as a ceiling 187. The track member 172 may be held in position with respect to the supporting structure 187 by screws 188 which extend through the beveled openings 189 in the top wall 184.

A plurality of carriers 191, which may be identical to the carriers 13, may be supported upon the portions of the bottom wall 178 adjacent the slot 176 therein for movement lengthwise of the track member 172 in substantially the same manner as set forth above with respect to the corresponding structure shown in FIGURE 4.

A cord 192 (FIGURE 11) is disposed within the passageway 174 for connection with a master carrier which may be identical with the master carrier 14 shown in FIGURES 7 through 10, inclusive.

A pulley assembly, such as the pulley assembly 12 (FIGURES 5 and 6), can be mounted upon the track member 172 after removing a portion of the bottom wall 178 thereof, in substantially the same manner as set forth above with respect to the corresponding structure in the track member 11. Thus, the principal difference between the track assembly 171 and the track assembly 10 resides in the partial recessing of the track member 172 into the plaster coating 186.

Figures 15, 17:
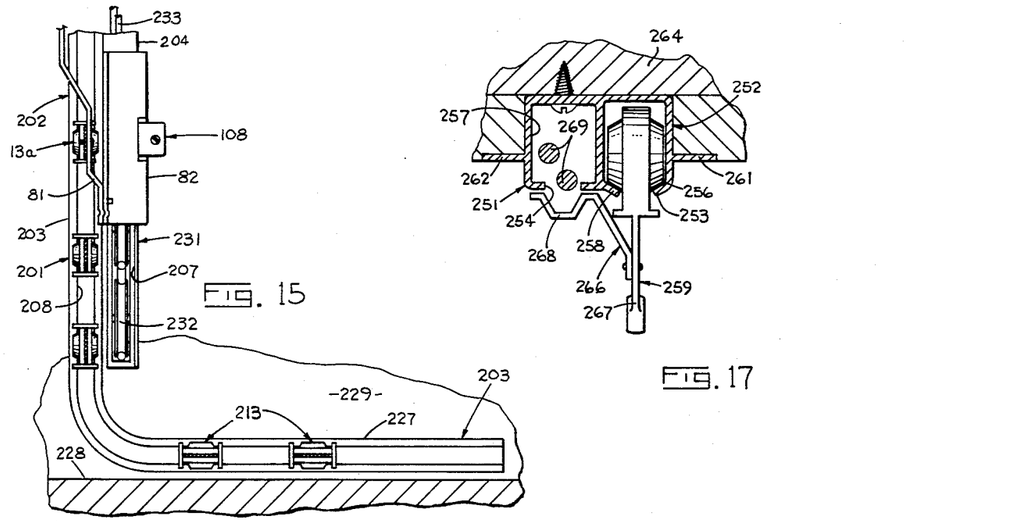
FIGURE 15 is a broken sectional view taken along the line XV—XV in FIGURE 14.
FIGURE 17 is an end view of an alternate structure for a dual channel track member and carrier.
Figure 19:
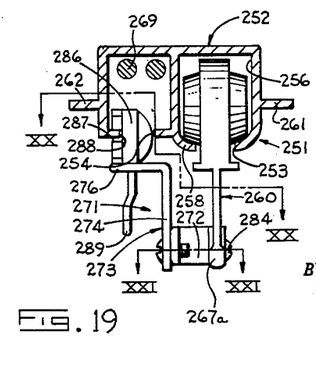
FIGURE 19 is an end elevational view of the track member shown in FIGURE 17 supporting a master carrier.
Figure 20:
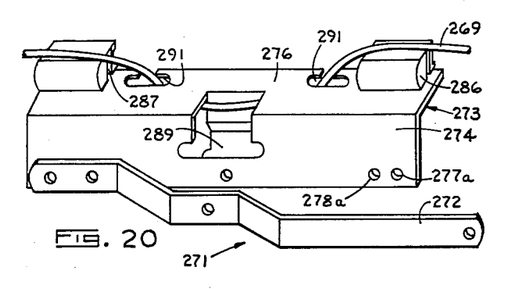
FIGURE 20 is a perspective view of the master carrier shown in FIGURE 19.
Figure 21:
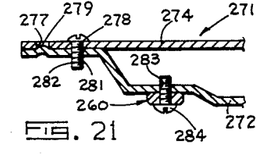
FIGURE 21 is a sectional view taken along the line XXI—XXI in FIGURE 19.

FIGURES 12 and 15, Inclusive

Figures 14, 16, 18:
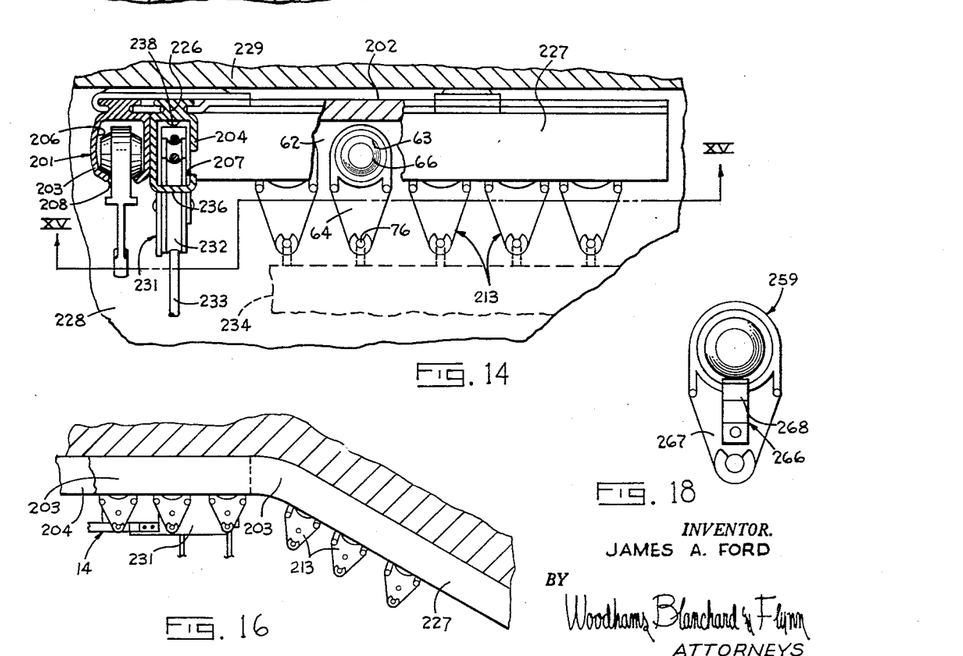
FIGURE 14 is an elevational view of a traverse assembly embodying the dual track member of FIGURE 12.
FIGURE 16 is a front elevational view of a further modification.
FIGURE 18 is a side elevational view of the carrier shown in FIGURE 17.

The further alternate traverse assembly 201, shown in FIGURES 12 to 15, inclusive, includes a track structure 202 which is generally similar in appearance to the track member 11 (FIGURE 4). However, the track structure 202 is comprised of a pair of separable track members 203 and 204 having independent wall means defining the front and rear passageways 206 and 207, respectively. The front track member 203 has a slot 208 in its bottom wall 209 and the rear track member 204 has a lengthwise slot 211 through the rear wall 212 thereof. Carriers 213 (preferably similar to carriers 13 above described) are supported within the track member 203 (FIGURE 13) and a master carrier, such as the master carrier 14 (FIGURE 7), may be mounted within and upon the track members 203 and 204 in the same manner as above described in connection with FIGURES 1 to 10 when said track members 203 and 204 are supported in their adjacent operating positions as shown in FIGURE 14.

The clamp bracket 214, which may be similar to the clamp bracket 46 of FIGURE 4, is comprised of a hooked bar 216 and clamping plate 217 which engage flanges 218 and 219 on the remote edges of the upper walls of the track members 203 and 204 in a manner substantially as set forth above with respect to track member 11 and clamp bracket 46. It may also be desirable to place one or more locking strips 221 into the adjacent grooves 222 and 223 in the opposing edges of the top walls 224 and 226 on the track members 203 and 204, respectively, to rigidify the structure. The hooked bar 216 has a downwardly extending, mounting flange 220 on the rearward end thereof for securement by screws 225 to a wall 228 or other substantially upright surface. Alternatively, said mounting flange 220 can be omitted and the hooked bar 216 mounted directly to a ceiling.

By having separable track members 203 and 204, they can be conveniently cut in varying relative lengths for special uses. For example, and as shown in FIGURES 14 and 15, the front track member 203 can be curved near one end thereof to provide an end portion 227 which is disposed substantially at right angles to the main part of the track member 203, so that said end portion can extend along and be mounted upon a side wall 228 adjacent the ceiling 229. Said mounting may be in the same manner as above described in connection with FIGURE 12. Pulley assemblies, such as the pulley assembly 231, can be mounted upon and adjacent the opposite ends of the track member 204, which is preferably straight so that the pulleys 232 therein are radially aligned with the pasageway 207 in the rear track member 204. Accordingly, when the cord 233 is operated, all or any selected number of the carriers 213 can be moved completely past the pulley assembly 231 into the end portion 227 of the front track member 203.

This arrangement is useful in several circumstances, such as where a window is nearly the full width of the room and no curtain pack back is desired in front of the window, or where the panels 234 (FIGURE 14) supported upon the carriers 213 are fabricated from relatively thick materials, or from materials which bend but do not fold easily so that it is desirable for the traverse assembly 201 (FIGURES 14 and 15) to permit the backup of such panels into a position along the wall 228 to provide a maximum opening of such panels within the space traversed by the rear track member 204. Further, the traverse assembly 201 can also be utilized for supporting panels comprised of a plurality of relatively rigid elements connected for permitting the turning movement onto the end portion 227 of the front track 203.

FIGURE 16 shows a still further arrangement possible with the modification involving the separate channels 204 and 227. Whereas FIGURES 14 and 15 show the slide carrying channel 227 curved in a horizontal plane past the end of the cord carrying channel 204, FIGURE 16 shows said slide carrying channel 227 curved through a vertical plane past the ends of said cord carrying channel. This may be appropriate where the ceiling against which said traverse rod is to be laid curves in a vertical direction near the edge of the traverse rod zone.

As shown in FIGURE 14, the pulley assembly 231 may project into the passageway 207 within the rear track member 204 through an opening in the bottom wall 236 (FIGURE 14) thereof and secured to the top wall 226 thereof by screws 238.

*FIGURES 17 to 23, Inclusive*

A still further modification (FIGURE 17) can be utilized where it is desired to recess the track into a ceiling even further than is possible with the form of FIGURE 11, the presence of the slot 177 providing in this latter case a limit to the extent of such recessing. Under some circumstances, the FIGURE 17 form sacrifices some of the advantages of the FIGURE 11 form but it maintains many of the advantages of the invention and does permit greater recessing than does the FIGURE 11 form. In the FIGURE 17 form, the track member 252 of the traverse assembly 251 is similar to the track member 172 in FIGURE 11, except for the location of the slot through the rear wall thereof. That is, the slots 253 and 254, which communicate with the passageways 256 and 257 in the track member 252, are both located in the lower wall 258 thereof. Carriers 259 are supported upon the portions of the lower wall 258 adjacent the slot 253 in substantially the same manner that the carriers 191 are supported within track member 172. The track 252 has a pair of sidewardly extending, coplanar flanges 261 and 262 which are arranged so that they will be flush with the surface of the plaster 263 on the ceiling structure 264.

The carriers 259 may be substantially identical to the carriers 13 (FIGURE 4) except that a sidewardly projecting arm 266 is rigidly secured to the hanger 267 so that its free end portion 268 extends across and adjacent the slot 254. The arm 266 is provided for the purpose of engaging and supporting the cord 269, which may droop downwardly from the passageway 257 through the slot 254 in the lower wall 258. Thus, the arms 266 prevent said cord from either tangling or presenting an unsightly appearance.

The master carrier 271 (FIGURES 19, 20 and 21), is comprised of a carrier 260, which may be identical to carrier 213 (FIGURE 15) and to which the hanger bar 272 and outrigger 273 are secured. More specifically, the outrigger 273 is comprised of a plate 274 (FIGURE 19) having a rearwardly extending flange 276 along the upper edge thereof. The plate 274 has a pair of openings 277 and 278 (FIGURE 21) therethrough along the lower edge of the plate and adjacent one end thereof. A similar pair of openings 277a and 278a (FIGURE 20) are provided through the plate 274 along the lower edge thereof and near the other end of the plate. The hanger bar 272 has a dimple 279 (FIGURE 21) adjacent one end thereof and receivable into one of the openings 277 and 277a in the plate 274. Said hanger bar 272 has a threaded opening 281 which is adjacent the dimple 279 and is aligned with the opening 278 for reception of a screw 282, when the dimple 279 is in opening 277, for the purpose of rigidly securing the hanger bar 272 upon the plate 274. The hanger bar 272 also has a threaded opening 283 near the middle thereof for threaded reception of the screw 284 which extends through an opening in the lower end of the hanger 267a on the carrier 260.

A pair of sliders 286 (FIGURES 19 and 20) are secured upon flange 276 near the opposite ends thereof, said sliders having rearwardly facing grooves 287 into which the edge 288 of the lower wall 258 (FIGURE 17) defining the slot 254 is slidably received.

A T-shaped tongue 289 is struck out of the adjacent portions of the plate 274 and flange 276 so that it extends downwardly from the flange 276 substantially parallel with the plate 274 on the rearward side thereof. A pair of spaced notches 291 (FIGURE 20) are provided in the flange 276 so that they open through the rearward edge thereof on opposite sides of the tongue 289. A portion of the cord 269 (FIGURE 20) can be led downwardly through slot 254 in the lower wall 258 and inserted into the notches 291 on opposite sides of the tongue 289 and thence looped around the front side of said tongue (FIGURE 20) adjacent the plate 274 to effect movement of the master carrier 271 in response to movement of the cord 269 lengthwise of the track member 252.

*FIGURES 22 to 25, Inclusive*

The pulley assembly 294 (FIGURES 22, 23, 24 and 25) is specially adapted for use with a track member of the type shown in FIGURE 17 at 252 which is recessed into the ceiling and has two downwardly opening slots 253 and 254. The pulley assembly 294 includes a pair of side plates 296 and 297 which are substantially parallel throughout their lengths. A pair of pulleys 298 and 299 (FIGURE 24) are rotatably supported by axles 301 and 302 upon and between the side plates 296 and 297. The side plates 296 and 297 have inner end portions 303 and 304 (FIGURE 24) which are offset toward each other and which project above (FIGURE 23) the upper edges of said plates for insertion through the slot 254 (FIGURE 23) into the passageway 257 when said upper edges of said side plates 296 and 297 are parallel with and bearing against the lower wall 258 of said track member on opposite sides of the slot 254. The upper ends of the portions 303 and 304 (FIGURE 24) are bent away from each other to form the flanges 306 and 307, respectively, which overlie the edges of the wall 258 adjacent the slot 254 within the passageway 257.

The outer ends of the side plates 296 and 297 (FIGURE 25) have near their upper edges, a pair of integral flanges 308 and 309 which extend toward each other in adjacent overlapping relationship. The flanges 308 and 309 have aligned openings 311 and 312 through which a screw 313 is received for threaded engagement with a bar 314. Said bar 314 can be turned one way to enter through the slot 254 within the passageway 257 and can then be turned crosswise (FIGURE 25) to straddle the slot 254, whereby the outer end of the pulley assembly 294 is rigidly secured with respect to the track member 252 directly beneath the passageway 257.

The front side plate 296 of the pulley assembly 294 has an integral, L-shaped finger 316 struck out frontwardly therefrom so that it is disposed directly below and adjacent the slot 253 in the track member 252 to prevent accidental disengagement of the carriers 260 from within the track member 252.

Figure 22:
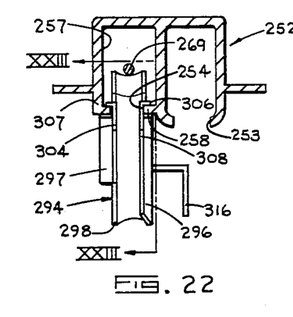
FIGURE 22 is a cross-sectional view of the dual track member shown in FIGURE 17 including a pulley assembly associated therewith.
Figure 23:
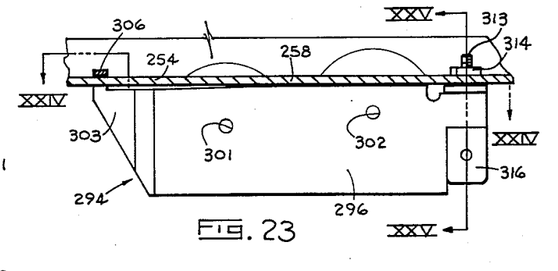
FIGURE 23 is a sectional view taken along the line XXIII—XXIII in FIGURE 22.
Figure 24:
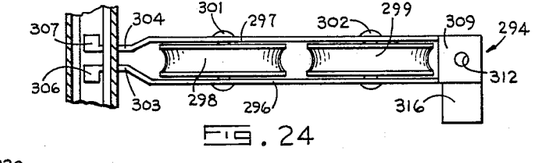
FIGURE 24 is a sectional view substantially as taken along the line XXIV—XXIV in FIGURE 23 with the parts thereof in partially assembled positions.
Figure 25:
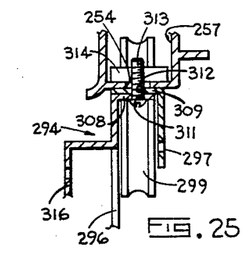
FIGURE 25 is a sectional view taken along the line XXV—XXV in FIGURE 23.

The pulley assembly 294 is mounted upon the track member 252 by positioning same transversely thereof so that the flanges 306 and 307 on the end portions 303 and 304, respectively, can be inserted through the slot 254, as shown in FIGURE 24. The pulley assembly 294 is then pivoted 90 degrees in either direction from its FIGURE 24 position around said portions 303 and 304 so that it is aligned with and adjacent to the slot 254, as shown in FIGURES 22, 23 and 25. The flanges 306 and 307 thus slide over the adjacent portions of the lower wall 258 on opposite sides of the slot 254 and thereby hold the inner end of the pulley assembly 294 in position. By means of the screw 313 and the bar 314, the outer end of the pulley assembly 294 is held in position, as discussed above. The pulleys 298 and 299 project upwardly through the slot 254 into the passageway 257 for engaging the cord 269 therein.

Figure 26:
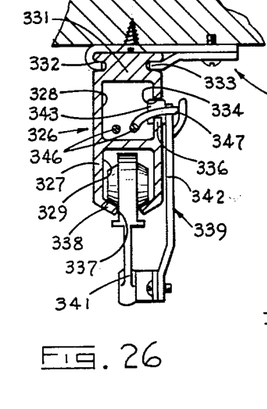
FIGURE 26 is an end elevational view of another traverse assembly including a dual channel track member and a master carrier.

*FIGURE 26*

FIGURE 26 illustrates another alternate traverse assembly 326 including a track member 327 having wall means defining upper and lower passageways 328 and 329 disposed one on top of the other. The top wall 331 of the track member 327 has a pair of sidewardly and oppositely opening grooves 332 and 333 into which portions of a clamp bracket 330, which may be similar to the bracket 46 in FIGURE 4, can be received for gripping said track member 327 and thereby securing same to a ceiling structure. A slot 334 is provided through the side wall 336 of the track member 327 so that it communicates with the upper passageway 328. A slot 337 is provided through the bottom wall 338 of the track member 327 so that it communicates with the lower passageway 329.

The master carrier 339 is comprised of a carrier 341, which may be substantially identical to the carrier 13 shown in FIGURE 4, and an outrigger 342 which is secured to the lower end of the carrier 341 and extends upwardly therefrom along the outside of the side wall 336. A slider 343 is mounted upon the upper end of the outrigger 342 for slidable engagement with the edge portions of the side wall 336 defining the slot 334. The cord 346 within the upper passageway 328 is connected to the master carrier 339 by means of a finger 347 on the outrigger 342 adjacent the slider 343.

Although particular preferred embodiments of the invention have been disclosed herein for illustrative purposes, it will be understood that variations or modifications of such disclosure, which come within the scope of the appended claims, are fully contemplated.

What is claimed is:

1. In a traverse assembly for supporting substantially upright panels, the combination comprising:
   an elongated, rigid track structure having wall means forming first and second downwardly opening, elongated and parallel channels defining passageways disposed in side-by-side relationship, said passageways having the major portions thereof in horizontal alignment and on opposite sides of an upright center wall means, said passageways being spaced from each other a distance substantially equal to the thickness of said center wall means;
   first flange means on said wall means for positioning and mounting said track structure with respect to a horizontal supporting surface;
   second flange means on said channel members defining first and second slide rail means extending along the opposite edges of each of the open sides of said first and second channels, respectively;
   a plurality of first carrier means extending into said first channel and supported upon said first slide rail means for movement lengthwise thereof;
   second carrier means extending into said second channel and supported upon said second slide rail means for movement lengthwise thereof, said second carrier means including
   an outrigger member connected to one of said first carrier means; and
   an elongated flexible element having two parallel portions disposed within said second channel and connected to said second carrier means for effecting movement thereof.

2. The structure of claim 1 wherein said second carrier means includes a groove in a side thereof near one rail of said second slide rail means and a convex surface on the side thereof near the opposite rail of said second slide rail means, whereby said second carrier means can be mounted upon the second rail means by causing said second rail means to enter said groove and by rocking said outrigger member around said second rail means into the supporting position.

3. A traverse rod construction comprising:
   wall means defining a pair of elongated parallel channels connected to and located adjacent each other, at least one of said channels opening downwardly, said channels having coplanar top walls and having central wall means extending downwardly from said top walls and separating said channels from each other, each of said channels having a pair of lengthwise flanges adjacent the open side thereof, said flanges extending toward each other and defining a slot of narrower width than said channel and communicating with the interior thereof, said channels defining parallel passageways having the major portions thereof in horizontal alignment and on opposite sides of said central wall means, said passageways being spaced from each other a distance substantially equal to the thickness of said central wall means;
   carriers disposed within said one channel and engaging the lateral flanges thereof whereby said carriers can move longitudinally along said one channel;
   elongated flexible element means disposed in the other channel for lengthwise movement therewithin and means extending through the slot of said other channel and connecting said flexible element means to selected ones of said carriers;
   top flange means on said top walls defining oppositely facing, laterally opening grooves; and
   mounting means extending substantially parallel with and located immediately above said top walls and having portions received into said grooves whereby said traverse rod construction is mounted upon a supporting structure.

4. A traverse assembly for supporting a panel for movement along a path, having a substantial horizontal component, comprising:
   first and second elongated rigid track members, in side-by-side relationship, having wall means defining, respectively, first and second elongated and parallel passageways, said wall means having first and second slots communicating, respectively, with said first and second passageways and extending lengthwise thereof, said first track member having an end portion extending beyond the adjacent end of the second track member, said passageways having the major portions thereof in horizontal alignment and on opposite sides of an upright center wall means, said passageways being spaced from each other a distance substantially equal to the thickness of said center wall means;
   bracket means for supporting the major portions of said track members in parallel relationship so that said first slot opens downwardly;
   a plurality of carriers supported upon the wall means of said first track member within said first passageway adjacent said first slot for movement lengthwise of said first track member and the end portion thereof, said carriers having hanger means extending through said first slot for connection to the panel;
   a master carrier slidably supported upon the wall means of the second track member adjacent said second slot, said master carrier being connectible to one of said carriers for movement lengthwise of said track members;
   an elongated flexible element having two parallel portions disposed substantially within, and extending lengthwise of, said second passageway, said element being connectible to said master carrier for effecting said movement of said one of said carriers lengthwise of said first track member; and
pulley means mounted upon the opposite ends of the second track member for engagement by said flexible element.

5. The device defined in claim 4 wherein the first track member curves at a point beyond the end of said second track member and extends in a horizontal direction transverse to the lengthwise extent of said second track member.

6. A traverse assembly for supporting panel means upon a support structure and for moving said panel means along a substantial horizontal path, comprising:
an elongated track assembly having wall means defining at least two elongated adjacent and parallel passageways extending lengthwise thereof, said passageways having the major portions thereof in horizontal alignment and on opposite sides of an upright center wall means, said passageways being spaced from each other a distance substantially equal to the thickness of said center wall means, the wall means associated with each of said passageways having parallel flange means defining slots running substantially the entire length of said track assembly;
means on said track assembly for positioning and mounting said track assembly with respect to a support structure;
first carrier means extending through one of said slots and into the passageway communicating therewith, said first carrier means being supported upon said flange means defining said one slot for movement lengthwise thereof and adapted to support said panel means;
second carrier means including a first portion extending through said one slot into the one passageway communicating therewith for support upon said flange means defining said one slot, and a second portion connected to said first portion and extending therefrom through the other slot into the other passageway for support upon the flange means defining said other slot, said second carrier means being movable lengthwise of said track assembly and adapted to engage said panel means for effecting said moving of same;
an elongated flexible element means disposed within and extending lengthwise of the other passageway, said flexible element being operably connected to the second portion of said second carrier means; and
pulley means near one end of the track and operably associated with said flexible element.

7. A traverse assembly for supporting a panel for movement along a substantially horizontal path, comprising:
an elongated, rigid track structure having wall means defining first and second, elongated, parallel and adjacent passageways, said passageways having the major portions thereof in horizontal alignment and on opposite sides of an upright center wall means, said passageways being spaced from each other a distance substantially equal to the thickness of said center wall means, said wall means having rails which define first and second, spaced and parallel slots communicating, respectively, with said first and second passageways and extending lengthwise thereof;
support means for positioning said track structure with respect to a supporting surface, so that said first slot opens downwardly;
a plurality of first carriers supported upon said rails within said first passageway adjacent said first slot for movement lengthwise of said track structure, said carriers having hanger means extending through said first slot for connection to the panel;
a second carrier including a first member supported upon said rails within said first passageway adjacent to said first slot and a second member connected to said first member and extending therefrom through the second slot into the second passageway for support upon said rail means defining said second slot, said second carrier being movable lengthwise of said track structure; and
an elongated, flexible element having two parallel portions disposed within and extending lengthwise of said second passageway, said element being operably connected to said second member for effecting movement of said first and second carriers lengthwise of said track structure.

8. The structure of claim 7 wherein said second slot opens sidewardly away from said first passageway adjacent the lower side of said track structure.

9. The structure of claim 7 wherein said second slot opens sidewardly away from said first passageway adjacent the lower side of said track structure; and
including a pair of coplanar flanges integral with said wall means and projecting sidewardly from opposite sides of said track structure, the plane defined by said flanges being substantially horizontal and passing through said first and second passageways adjacent the upper edge of the second slot.

10. The structure of claim 7 wherein said track structure is comprised of a pair of elongated, separable and substantially channel-shaped elements defining respectively said first and second passageways, and means for rigidly securing said channel-shaped elements together.

References Cited in the file of this patent

UNITED STATES PATENTS

| | | |
|---|---|---|
| 1,764,891 | Sarkisian | June 17, 1930 |
| 1,786,052 | Boye | Dec. 23, 1930 |
| 1,972,604 | Smith | Sept. 4, 1934 |
| 2,633,911 | Rosenbaum | Apr. 7, 1953 |
| 2,827,656 | Weber | Mar. 25, 1958 |
| 3,003,552 | Eilenberger | Oct. 10, 1961 |
| 3,060,490 | Saito | Oct. 30, 1962 |
| 3,074,356 | Parker et al. | Jan. 22, 1963 |

FOREIGN PATENTS

| | | |
|---|---|---|
| 542,393 | Germany | Jan. 23, 1932 |
| 513,877 | Great Britain | Oct. 24, 1939 |
| 656,704 | Great Britain | Aug. 29, 1951 |
| 866,832 | Germany | Feb. 12, 1953 |